US011106085B2

United States Patent
Zhong et al.

(10) Patent No.: US 11,106,085 B2
(45) Date of Patent: Aug. 31, 2021

(54) BASE FILM FOR LIGHT DIFFUSION FILM, LIGHT DIFFUSION FILM, DISPLAY APPARATUS, AND PRODUCTION METHOD THEREOF

(71) Applicants: CHONGQING BOE DISPLAY LIGHTING CO., LTD., Chongqing (CN); BOE TECHNOLOGY GROUP CO., LTD., Beijing (CN)

(72) Inventors: Xihong Zhong, Beijing (CN); Yong Yang, Beijing (CN); Shijun Zhao, Beijing (CN); Yujiao Jin, Beijing (CN); Yu Gong, Beijing (CN)

(73) Assignees: CHONGQING BOE DISPLAY LIGHTING CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/826,852

(22) Filed: Mar. 23, 2020

(65) Prior Publication Data

US 2021/0096426 A1 Apr. 1, 2021

(30) Foreign Application Priority Data

Sep. 29, 2019 (CN) .......................... 201910937675.1

(51) Int. Cl.
*G02F 1/1335* (2006.01)
*G02F 1/13357* (2006.01)
*G02B 1/14* (2015.01)
*G02B 1/04* (2006.01)

(52) U.S. Cl.
CPC ......... *G02F 1/133606* (2013.01); *G02B 1/04* (2013.01); *G02B 1/14* (2015.01); *G02F 1/133603* (2013.01); *G02B 2207/101* (2013.01); *G02F 1/133612* (2021.01)

(58) Field of Classification Search
None
See application file for complete search history.

(56) References Cited

U.S. PATENT DOCUMENTS

| | | | |
|---|---|---|---|
| 5,301,046 A | * | 4/1994 | Konuma ............... G02F 1/1334 349/89 |
| 7,821,611 B2 | | 10/2010 | Uehara et al. |
| 9,964,827 B1 | | 5/2018 | Lee et al. |
| 2007/0052879 A1 | | 3/2007 | Uehara et al. |

(Continued)

FOREIGN PATENT DOCUMENTS

| CN | 1928662 A | 3/2007 |
|---|---|---|
| CN | 101526674 A | 9/2009 |

(Continued)

OTHER PUBLICATIONS

First Chinese Office Action dated Feb. 23, 2021, received for corresponding Chinese Application No. 201910937675.1, 23 pages.

(Continued)

*Primary Examiner* — James A Dudek
(74) *Attorney, Agent, or Firm* — Kinney & Lange, P.A.

(57) ABSTRACT

A base film for a light diffusion film includes a transparent polymer layer, which comprises a plurality of nanopores, and liquid crystal filled in the plurality of nanopores. A light diffusion film, a display device, and production methods thereof are also disclosed.

14 Claims, 2 Drawing Sheets

(56) References Cited

U.S. PATENT DOCUMENTS

2009/0225244 A1    9/2009  Wang et al.
2015/0293402 A1*  10/2015  Shinkai ............... G02F 1/13476
                                                        349/15
2016/0085095 A1*   3/2016  Chien ................ C09K 19/0275
                                                        349/33

FOREIGN PATENT DOCUMENTS

CN    103792717 A    5/2014
CN    205845419 U   12/2016
CN    108761934 A   11/2018

OTHER PUBLICATIONS

"New Materials for Strategic Emerging Industries in China", Xu Zhikang, Wanling Book, et al., Beijing: China Railway Publishing House, pp. 121-123 (Dec. 2017).

* cited by examiner

BASE FILM FOR LIGHT DIFFUSION FILM, LIGHT DIFFUSION FILM, DISPLAY APPARATUS, AND PRODUCTION METHOD THEREOF

CROSS-REFERENCE TO RELATED APPLICATION

This application claims the priority of Chinese Patent Application No. 201910937675.1 filed on Sep. 29, 2019, which is incorporated herein in its entirety by reference.

TECHNICAL FIELD

This disclosure relates to the field of light diffusion films, and particularly to a base film for a light diffusion film, a light diffusion film, a display apparatus, and production methods thereof.

BACKGROUND ART

Nowadays, light diffusion films are used in display apparatuses using backlight modules (e.g. in a liquid crystal display apparatus), to allow light emitted from backlight modules to be more uniform. The structure of a light diffusion film is typically a double-layer structure, comprising a base film and a light diffusion layer formed on the surface of the base film.

Transparent polymers such as polyethylene terephthalate (PET)-based materials have been used as base films of light diffusion films. However, transparent polymer base films have the characteristic of being prone to be wrapped, and the display effect is thus influenced.

Additionally, once the material of the base film of the light diffusion film is determined, the transmittance of the light beam is also determined. Adjustment cannot be made according to the requirements of practical display.

With respect to base films for light diffusion films, there are still needs for the improvement.

SUMMARY OF THE INVENTION

In one aspect, this disclosure provides a base film for a light diffusion film, the base film comprising:
a transparent polymer layer, which comprises a plurality of nanopores; and
liquid crystal filled in the plurality of nanopores.

Optionally, the transparent polymer is a polyethylene terephthalate-based material.

Optionally, the nanopore has a pore size in a range of 50-100 micrometers.

Optionally, the nanopore in the base film has a porosity in a range of 10-50%.

In another aspect, this disclosure provides a light diffusion film for uniformalizing light emitted from a light source in a display apparatus, the light diffusion film comprising:
a base film as described above;
a light diffusion layer on a side of the base film; and
a transparent printed circuit layer on the other side of the base film, wherein the transparent printed circuit layer is configured to apply electrical field to the liquid crystal in the base film to adjust the transmittance property of the liquid crystal.

Optionally, the light diffusion layer is a silicon dioxide particle layer or a microprism layer.

Optionally, the light diffusion film further comprises a transparent circuit protective coating layer, wherein the transparent circuit protective coating layer is at a side of the transparent printed circuit layer away from the base film.

Optionally, the light diffusion film further comprises a transparent adhesive layer, wherein the transparent adhesive layer is at a side of the transparent circuit protective coating layer away from the transparent printed circuit layer.

In yet another aspect, this disclosure provides a display apparatus, comprising:
a back light source,
a light diffusion film according to claim 5 at a side of a light-emitting surface of the back light source, wherein the back light source is at a side of the light diffusion film where the transparent printed circuit layer is located, and
a display panel, which displays by using light emitted from the back light source.

Optionally, the display panel is a liquid crystal display panel.

In still another aspect, this disclosure provides a method for producing the base film as described above, the method comprising:
bombarding a transparent polymer layer with particles, to form a plurality of nanopores; and
filling liquid crystal in the plurality of nanopores.

Optionally, a base solution is used to corrode the bombarded transparent polymer layer in the step of forming form a plurality of nanopores.

Optionally, the base solution is a NaOH solution.

Optionally, the particles are silicon dioxide particles.

In further another aspect, this disclosure provides a method for producing a light diffusion film for uniformalizing light emitted from a light source in a display apparatus, the method comprising:
producing a base film by the method described above;
forming a light diffusion layer on a side of the base film; and
forming a transparent printed circuit layer on the other side of the base film.

Optionally, the transparent polymer is a polyethylene terephthalate-based material, and
the light diffusion layer is formed by depositing silicon dioxide particles or forming silicon dioxide microprisms.

DETAILED DESCRIPTION OF EMBODIMENTS

Figure 1:
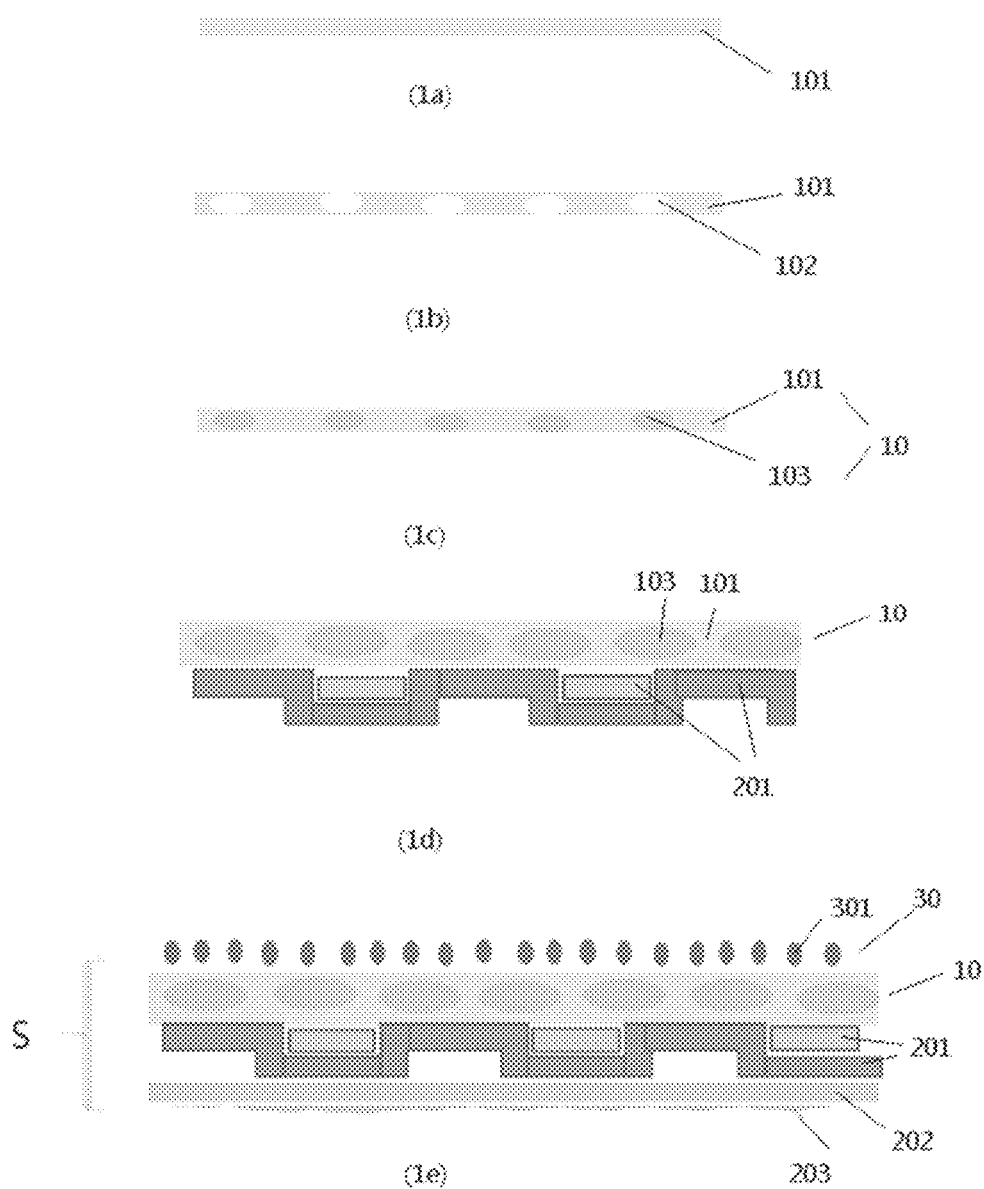
FIG. 1 schematically shows a method in an embodiment of this disclosure.

A light diffusion film is typically composed of a transparent polymer base film and a transparent light diffusion layer on the polymer base film. The polymer base film is mainly used for supporting the light diffusion layer. The light diffusion layer is typically a microstructure made of a transparent material having a specific refractive index, for example a granular transparent material layer. In the current field of light diffusion films, polyethylene terephthalate films are commonly-used transparent polymer base films.

However, these light diffusion films have the characteristic of being prone to be wrapped, and the display effect is thus influenced.

This disclosure proposes a base film for a light diffusion film, the base film comprising:

a transparent polymer layer, which comprises a plurality of nanopores; and liquid crystal filled in the plurality of nanopores.

The base film of this disclosure comprises a transparent polymer layer having a plurality of nanopores. The inventor of this disclosure has found that wrapping of the base film may be effectively prevented by introducing nanopores to the transparent polymer layer. Without relying on any theory, this may be for the reason that microscopic damage is physically made to the transparent polymer layer due to the presence of nanopores so as to reduce intermolecular Van-der-Waals forces in the transparent polymer layer, thereby preventing wrapping. In this way, the light diffusion layer produced from the base film this disclosure is not prone to be wrapped and a good display effect is finally obtained.

The main material of the base film of this disclosure may be any suitable transparent polymer. From the view point of the display performance, the higher the light transmittance of the transparent polymer, the better. In this disclosure, description is usually made by taking an example in which a polyethylene terephthalate-based material is used as the main material of the base film. The polyethylene terephthalate-based material refers to a material based on polyethylene terephthalate, and may include polyethylene terephthalates having various molecular weights and modified polyethylene terephthalates. The PET-based material has been used for producing conventional light diffusion film at present, due to its high light transmittance. The PET-based material is a preferred main material of the base film. In this disclosure, particular properties of the PET-based material are not particularly specified, as long as it is suitable for supporting light diffusion layer.

The nanopore is a nanoscale pore in the transparent polymer layer. The pore may be a via hole or not a via hole. The nanopore has two functions in this disclosure, in which one is to prevent wrapping of the base film as described above and the other one is to contain liquid crystal as described below.

The nanopore is filled with liquid crystal. The liquid crystal complements the space of the nanopore on the one hand, and confers a variable light transmittance to the base film.

As well known, the liquid crystal material may be subjected to inversion under the effect of an electric field so as to change optical properties. Therefore, the liquid crystal may turn on and off light under the effect of an electric field. Liquid crystal may be divided into nematic liquid crystal, smectic liquid crystal, cholesteric liquid crystal, and the like. When liquid crystal is filled in the nanopore, the light transmittance of the base film is allowed to be different from that of a simply transparent polymer layer, and the light transmittance of the base film may be further adjusted in real time by externally applying an electric field. The cholesteric liquid crystal is preferably used.

The nanopore may have a pore size in a range of 50-100 micrometers. If the pore size is less than 50 micrometers, the effects of liquid crystal filling and light modulation are poor; and if the pore size is greater than 100 micrometers, the liquid crystal module may exhibit particle-like sensation, which influences the image display effect.

The nanopore may have a porosity in a range of 10-50%. The porosity determines the content of the liquid crystal in the base film to some extent. When the porosity is less than 10%, the effect of the liquid crystal on the improvement of wrapping and light transmittance are is not remarkable; and when the porosity is higher than 50%, it is disadvantageous to form a diffusion layer in a light diffusion film.

The base film for a light diffusion film in this disclosure will not be wrapped, and the light transmittance may be adjusted.

This disclosure further provides a light diffusion film for uniformalizing light emitted from a light source in a display apparatus, the light diffusion film comprising:

a base film as described above;

a light diffusion layer on a side of the base film; and a transparent printed circuit layer on the other side of the base film, wherein the transparent printed circuit layer is configured to apply electrical field to the liquid crystal in the base film to adjust the transmittance property of the liquid crystal.

The function of the light diffusion layer is to uniformly scatter light emitted from a back light source. The light diffusion layer is located on a side of the base film, and is located on a side of the base film opposite to the back light source when mounted in a backlight module. When the light emitted from the back light source is emitted from the light diffusion layer, it becomes more uniform.

The light diffusion layer is made of a transparent material and has a specific microstructure. For example, the light diffusion layer may be particles or microprisms.

A transparent printed circuit layer is used to apply an electric field to the base film so as to adjust the light transmittance properties, such as transmittance index of the liquid crystal in the base film. Some liquid crystals have electrochromism property. The arrangement of liquid crystal in the base film may be changed by applying an electrical field, so that the transmittance properties thereof may be changed.

The light diffusion layer may be a silicon dioxide particle layer or a microprism layer. Silicon dioxide is prone to form a light diffusion layer, and well cooperates with a polyethylene terephthalate-based substrate in terms of optical and mechanical properties.

The light diffusion film may further comprise a transparent circuit protective coating layer. The transparent circuit protective coating layer is used to protect the circuit. The transparent circuit protective coating layer is at a side of the transparent printed circuit layer away from the base film.

The light diffusion film may further comprise a transparent adhesive layer, as long as the light diffusion effect is not influenced. The transparent adhesive layer is at a side of the transparent circuit protective coating layer away from the transparent printed circuit layer. The transparent adhesive layer is used to assemble the light diffusion film into a backlight module. In order to facilitate storage, the transparent adhesive layer may be further covered by a release layer.

This disclosure further provides a display apparatus, comprising a display panel, a back light source, and a light diffusion film as described above.

In particular, the display apparatus comprises:

a back light source, a light diffusion film according to claim 5 at a side of a light-emitting surface of the back light source, wherein the back light source is at a side of the light diffusion film where the transparent printed circuit layer is located, and a display panel, which displays by using light emitted from the back light source.

It is known in the art to use the light diffusion film and the back light source in cooperation. For example, a light guide plate and a bottom reflection sheet may be provided on a side of the diffusion film opposite to the light diffusion layer, and the light emitted from the back light source is allowed to be incident from a side surface of the light guide plate and is finally uniformly emitted from a side of the light diffusion layer of the light diffusion film.

Various display panels displaying by using light emitted from a back light source may be used. In particular, liquid crystal display panels are preferred.

This disclosure further provides a method for producing the base film as described above, the method comprising:

bombarding a polyethylene terephthalate-based material layer with particles, to form a plurality of nanopores; and filling liquid crystal in the plurality of nanopores.

A base solution may be used to corrode the bombarded transparent polymer layer in the step of forming form a plurality of nanopores.

This disclosure employs a method using a mechanical means or combining mechanical and chemical means to form desired nanopores in the transparent polymer layer.

Nanopores may be formed by using a simply mechanical means. Particularly, particles are accelerated by high-speed gas or explosion to obtain high-speed particles, and the transparent polymer layer is bombarded with the high-speed particles to form nanopores in the transparent polymer layer.

The particle in this disclosure may be minute granules which may result in slight damage to the transparent polymer layer. Useful particles include high-hardness microparticles such as silicon dioxide particles and the like. The suitable size of the particle is related to its bombarding speed and the pore size desirable to be obtained, and is not particularly limited herein.

Alternatively, first, particles are accelerated by high-speed gas or explosion to obtain high-speed particles, and the transparent polymer layer is bombarded to form sub-nanoscale minute pits on the transparent polymer layer. Subsequently, the transparent polymer layer having minute pits is treated with a base solution. The transparent polymer layer is not resistant to strong bases. When the transparent polymer layer is treated with a base solution, the corrosion speed at a minute pit is higher than that on a flat surface so as to form nanopores. Preferably, the base solution is a NaOH solution.

The formation of nanopores destroys the intermolecular Van-der-Waals forces of polyethylene terephthalate, so that the polyethylene terephthalate-based material film will not be wrapped.

Finally, liquid crystal is filled in the nanopores in a suitable manner. An example of the method of filling may be a dropping method.

This disclosure further provides a method for producing a light diffusion film for uniformalizing light emitted from a light source in a display apparatus, the method comprising: producing a base film by the method described above; forming a light diffusion layer on a side of the base film; and forming a transparent printed circuit layer on the other side of the base film.

The light diffusion film described above is formed by the method described above. A transparent circuit may be printed on the polymer layer in a conventional manner, and the light diffusion layer may be formed on the base film in a conventional manner.

Preferably, the transparent polymer is a polyethylene terephthalate-based material, and the light diffusion layer is formed by depositing silicon dioxide particles or forming silicon dioxide microprisms. Silicon dioxide is prone to form a light diffusion layer, and well cooperates with a polyethylene terephthalate-based substrate in terms of optical and mechanical properties.

The technical solutions of this disclosure will be further described below by way of accompanying drawings and Examples.

FIG. 1 schematically shows a method in an embodiment of this disclosure. First, a polyethylene terephthalate (PET) layer 101 is provided (FIG. 1a). The polyethylene terephthalate layer 101 is bombarded with heavy particles to obtain a polyethylene terephthalate layer 101 having nanopores 102 (FIG. 2), wherein the white ellipses illustratively show nanopores. Then a liquid crystal material 103 is filled into the polyethylene terephthalate layer 101 having nanopores 102, to obtain a PET layer with nanopores and liquid crystal (FIG. 1c), i.e. a base film 10, in which the nanopores have been filled by liquid crystal material 103. Optionally, upper and lower protective coating layers may be applied to the PET layer. Subsequently, a transparent circuit 201 is printed on one side of the base film 10 (FIG. 1d). The rectangular blocks illustratively show the transparent printed circuit layer 201, which may apply an electrical field to the liquid crystal 103. Subsequently, a lower protective coating layer 2-2 and a lower back-coated adhesive 203 are applied below the transparent circuit. Diffusion particles 301 are applied on the opposite side of the polyethylene terephthalate layer (FIG. 1e). Thereby, a light diffusion layer 30 is produced. Thereby, the light diffusion film S is formed.

Figure 2:
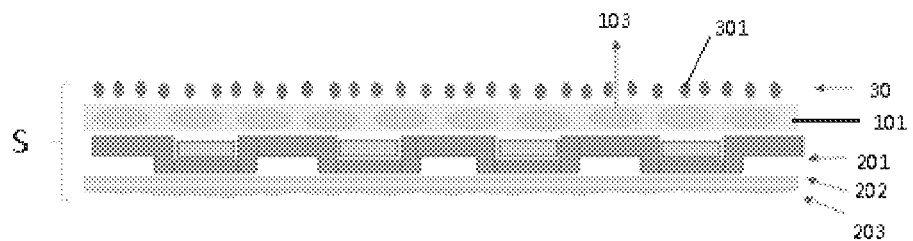
FIG. 2 shows a light diffusion film in an embodiment of this disclosure.

FIG. 2 shows a light diffusion film in an embodiment of this disclosure, wherein the light diffusion layer 30 is composed of silicon dioxide diffusion particles 301.

Figure 3:
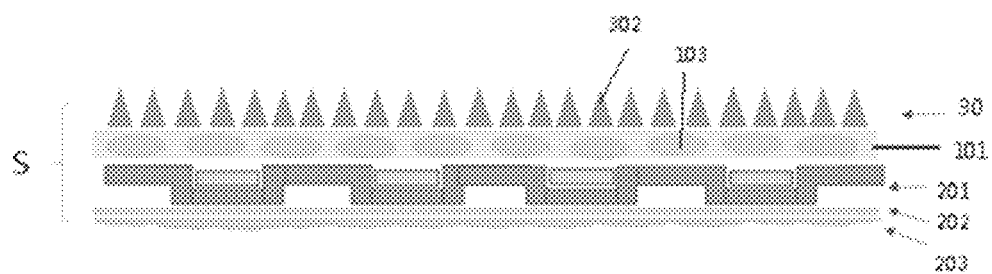
FIG. 3 schematically shows a light diffusion film in another embodiment of this disclosure.

FIG. 3 schematically shows a light diffusion film in another embodiment of this disclosure, wherein the light diffusion layer 30 is composed of silicon dioxide microprisms 302.

Figure 4:
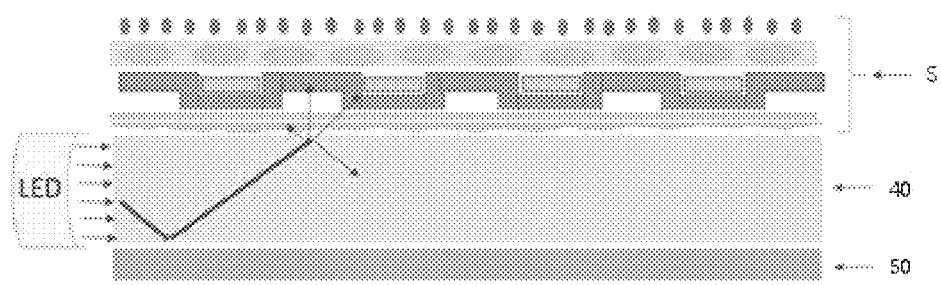
FIG. 4 schematically shows a manner in which a light diffusion film cooperates with a back light source in another embodiment of this disclosure.

FIG. 4 schematically shows a manner in which a light diffusion film cooperates with a back light source in another embodiment of this disclosure. An LED back light source is incident from a side surface, is affected by a light guide plate 40 and a bottom reflection sheet 50, and passes through the light diffusion film S, i.e., sequentially passes through a transparent printed circuit layer, a polyethylene terephthalate base film layer, and a light diffusion layer, and is finally uniformly emitted.

EXAMPLES

Production of Polyethylene Terephthalate Base Film for Light Diffusion Film

In this Example, a PET film was used, which had a size of 400 mm×700 mm (an experimental sample) and a thickness of 0.05 mm.

The polyethylene terephthalate-based film was placed in a bombarding apparatus. Silicon dioxide particles were used, and particles were accelerated by high-pressure gas to bombard the polyethylene terephthalate-based film.

After bombarding, the polyethylene terephthalate-based film was placed in a sodium hydroxide solution for corrosion.

The polyethylene terephthalate-based film was washed several times with deionized water, and dried.

Subsequently, liquid crystal was filled into nanopores by a dropping method.

Protection coating layers were applied to both sides of the polyethylene terephthalate-based film filled with liquid crystal, and dried.

Thereby, a base film was produced.

Production of Light Diffusion Film

A silicon dioxide particle layer was deposited as a light diffusion layer on a side of the produced base film.

A transparent printed circuit layer was printed on the other side of the produced base film. The transparent printed circuit layer was designed to be capable of applying a voltage to the liquid crystal in the base film.

The transparent printed circuit layer is covered by a protective back coating film. Then, it was further covered by a back-coated adhesive layer for bonding to a backlight module.

Thereby, a light diffusion film was produced.

Production and Properties of Display Apparatus

The produced light diffusion film and an optical prism film were assembled into a backlight module, so that a back light source apparatus was produced.

The wrapping resistance of the light diffusion film was measured in a testing manner of marble platform+plug gauge. The wrapping resistance was that the greatest extent of wave-like wrapping was less than 0.4 mm. In comparison, the wrapping resistance of an ordinary polyethylene terephthalate light diffusion film was 0.5 mm-1 mm.

By applying a voltage to the base film by the transparent circuit in the light diffusion film, the light transmittance was found to be changed.

The advantageous effects of the technical solutions of this disclosure include but are not limited to following effects. Polyethylene terephthalate is treated by nanopores and intermolecular Van-der-Waals force of polyethylene terephthalate is destroyed by a physical method, so that the diffusion film is not prone to be wrapped. By filling liquid crystal in nanopores and in cooperation of a transparent printed circuit, the transmittance of the diffusion film was enabled to be overall controllable under the control of voltage. 3. Compared to current liquid crystal display screens, nanoporous diffusion film enables display images to be subjected to brightness adjustment according to the requirements of practical display, and display screens can achieve a higher contrast.

Obviously, various modifications and variations may be made to the Examples of this disclosure by those skilled in the art without deviating from the spirit and the scope of this disclosure. Thus, if these modifications and variations of this disclosure are within the scope of the claims of this disclosure and equivalent techniques thereof, this disclosure also intends to encompass these modifications and variations.

What is claimed is:

1. A light diffusion film for uniformalizing light emitted from a light source in a display apparatus, the light diffusion film comprising:
    a base film, wherein the base film comprises a transparent polymer layer, which comprises a plurality of nanopores, and liquid crystal filled in the plurality of nanopores;
    a light diffusion layer on a first side of the base film, wherein the light diffusion layer is in direct contact with the base film; and
    a transparent printed circuit layer on a second side of the base film, wherein the transparent printed circuit layer is configured to apply electrical field to the liquid crystal in the base film to adjust the transmittance property of the liquid crystal.

2. The light diffusion film according to claim 1, wherein the transparent polymer layer comprises a polyethylene terephthalate-based material.

3. The light diffusion film according to claim 1, wherein the nanopore has a pore size in a range of 50-100 micrometers.

4. The light diffusion film according to claim 1, wherein the nanopore in the base film has a porosity in a range of 10-50%.

5. The light diffusion film according to claim 1, wherein the light diffusion layer is a silicon dioxide particle layer or a microprism layer.

6. The light diffusion film according to claim 1, wherein the light diffusion film further comprises a transparent circuit protective coating layer, wherein the transparent circuit protective coating layer is at a side of the transparent printed circuit layer away from the base film.

7. The light diffusion film according to claim 6, wherein the light diffusion film further comprises a transparent adhesive layer, wherein the transparent adhesive layer is at a side of the transparent circuit protective coating layer away from the transparent printed circuit layer.

8. A display apparatus, comprising:
    a back light source,
    a light diffusion film according to claim 1 at a side of a light-emitting surface of the back light source, wherein the back light source is at a side of the light diffusion film where the transparent printed circuit layer is located, and
    a display panel, which displays by using light emitted from the back light source.

9. The display apparatus according to claim 8, wherein the display panel is a liquid crystal display panel.

10. A method for producing the light diffusion film of claim 1, the method comprising:
    producing the base film by bombarding the transparent polymer layer with particles to form the plurality of nanopores, and filling liquid crystal in the plurality of nanopores;
    forming the light diffusion layer on the first side of the base film; and
    forming the transparent printed circuit layer on the second side of the base film.

11. The method according to claim 10, wherein a base solution is used to corrode the bombarded transparent polymer layer in the step to the plurality of nanopores.

12. The method according to claim 11, wherein the base solution is a NaOH solution.

13. The method according to claim 10, wherein the particles are silicon dioxide particles.

14. The method according to claim 10, wherein:
    the transparent polymer layer comprises a polyethylene terephthalate-based material, and
    the light diffusion layer is formed by depositing silicon dioxide particles or forming silicon dioxide microprisms.

* * * * *